United States Patent
Okada et al.

[11] Patent Number: 5,938,403
[45] Date of Patent: Aug. 17, 1999

[54] RUNNER, WATER WHEEL AND METHOD OF MANUFACTURING THE SAME

[75] Inventors: Ryoji Okada, Ibaraki-ken; Kazuo Niikura, Hitachi; Keiji Taguchi, Ibaraki-ken; Kiyohito Tani, Hitachi, all of Japan

[73] Assignee: Hitachi, Ltd., Tokyo, Japan

[21] Appl. No.: 08/815,853

[22] Filed: Mar. 12, 1997

[30] Foreign Application Priority Data

Mar. 13, 1996 [JP] Japan .................................. 8-056311

[51] Int. Cl.$^6$ ....................................... F03B 3/12
[52] U.S. Cl. ....................................... 415/200; 416/241 R
[58] Field of Search ................................... 415/200, 229; 416/213 R, 213 A, 241 R, 241 B; 427/450, 451; 29/889.21, 527.4; 228/159

[56] References Cited

U.S. PATENT DOCUMENTS

| | | | |
|---|---|---|---|
| 3,758,233 | 9/1973 | Cross et al. ................. | 416/241 R X |
| 4,241,110 | 12/1980 | Ueda et al. ................. | 416/214 B X |
| 5,458,460 | 10/1995 | Okada et al. ................. | 415/229 |

FOREIGN PATENT DOCUMENTS

| | | | |
|---|---|---|---|
| 569704 | 6/1945 | United Kingdom .............. | 416/213 A |
| 728972 | 4/1955 | United Kingdom .............. | 415/200 |

*Primary Examiner*—John E. Ryznic
*Attorney, Agent, or Firm*—Antonelli, Terry, Stout & Kraus, LLP

[57] ABSTRACT

A water machinery runner, which is highly reliable and is so excellent in wear and corrosion resistances that it can be used even under conditions where sediment is contained in a fluid includes crown 21, band 22 and blade 23 of a water machinery runner 2 to be rotated by a working fluid or a fluid flowing in a passage. The elements of the machinery runner are coated on at least portions of their individual surfaces with a first surface film containing a metal, as selected from the group consisting of Ni, Cr and Co, and a chromium carbide, and a second surface film containing a metal, as selected from the group consisting of Ni, Cr and Co, and a tungsten carbide.

39 Claims, 6 Drawing Sheets

RUNNER, WATER WHEEL AND METHOD OF MANUFACTURING THE SAME

BACKGROUND OF THE INVENTION

The present invention relates to a runner and a water wheel, which exhibit excellent wear and corrosion resistance characteristics, and a method of manufacturing the same.

In recent years, a water wheel is more and more used under conditions where solid substances, such as sediment, is contained in a fluid. A runner, as driven under those conditions, is damaged by the combination of the wear due to impact with the sediment (referred to as "sedimental wear") and cavitation damage. Therefore, the portion to be damaged has been either lined with a resin, such as rubber, or spray-coated with a very hard material, such as a ceramics material. This technique is disclosed in Japanese Patent Laid-Open No. 47477/1991.

Generally speaking, a runner having a three-dimensional shape is frequently manufactured using a casting method. In a large-sized runner, on the other hand, there sometimes a method of assembling the runner by welding is used. In this case, stainless materials are welded into an assembly so as to enhance the mechanical strength of the runner. Specifically, a blade, a crown and a band or a shroud are separately formed of stainless materials, and the blade is welded between the crown and the band or the shroud to form the runner. At this time, the runner thus prepared is subjected, if necessary, to heat treatment so as to remove the residual stress established during the welding operation. This technique is disclosed in Japanese Patent Laid-Open No. 140465/1990.

In the case of sediment wear, on the other hand, the use of a variety of hard coatings has been investigated. For example, the bucket and needle chip of the Pelton wheel have been coated on their inner faces with a tungsten carbide surface film having a gradient composition by a vacuum plasma spray-coating method, as disclosed in Japanese Patent Laid-Open No. 88201/1994. On the other hand, the portion of the water wheel limited to the runner, which will be worn by sediment, is build-up welded with a Co alloy containing C, Si, Mn, Cr, Mo, Ni or Fe, as disclosed in Japanese Patent Laid-Open No. 75767/1990.

When the water machinery is to be used under conditions where sediment is contained in the fluid, as described above, the runner has to be coated with a very hard material, so that it may be prevented from being damaged by sediment wear and cavitation damage. Because of the three-dimensional shape, however, the runner is not easy to coat with the hard material.

The plating method can be used easily to coat an article having a complicated shape, but this method has the following problems when applied to the present invention. The Cr plating method is one of the most widely used electrolytic plating methods and can provide the highest surface film hardness in Vickers hardness (as will be expressed as "Hv") of about 1,000, of all the plated films. Because of the electrolytic plating, however, the electrolytic concentration is caused to vary due to the shape so as to make it difficult to have an even film thickness.

Because of the strain in the surface film, moreover, it is difficult with the plating method to form a thick film, i.e., a film having a sufficient thickness to protect against sediment wear and cavitation damage. On the other hand, Ni—P plating is a nonelectrolytic plating method so that it can form a surface film having an even thickness independently of the shape. As in the Cr plating method, however, with the Ni—P plating method it is difficult, due to the strain in the surface film, to form a thick film or a sufficient surface film to protect against sediment wear and cavitation damage. Moreover, both the Cr plating method and the Ni—P plating method are not practical for application to large-sized parts, such as a water wheel runner, from the point of view of the required facilities, because they require a step of dipping an article in a bath.

The hard coating film to be formed by the spray-coating method has a sufficient wear resistance to sediment wear and cavitation damage and can produce a sufficiently thick surface film easily. However, the use of the spray-coating method has the following problems. A proper distance is required between a spray-coating gun and the runner so as to form a satisfactory spray-coated surface film, and a relatively wide space is required due to the restriction provided by the size of the spray-coating gun. Therefore, it is difficult to spray coat a three-dimensional runner in a narrow space with a satisfactory surface film having sufficient hardness and adhesive strength.

The technique, as disclosed in the aforementioned Japanese Patent Laid-Open No. 88201/1994, is directed to a vacuum plasma spray-coating method which is applied to small-shaped parts having shapes facilitating a spray-coating treatment, that is members to be coated which can be accommodated in an evacuated container for the treatment. Therefore, the application of such a vacuum plasma spray-coating method to large-sized parts is difficult, and the application of the vacuum plasma spray-coating method to three-dimensional parts having complicated shapes is even more difficult. These problems have not been solved by the technique as disclosed in the aforementioned Japanese Patent Laid-Open No. 88201/1994.

On the other hand, the technique, as disclosed in the aforementioned Japanese Patent Laid-Open No. 75767/1990, is directed to a build-up welding treatment which is applied to a portion easy to be treated. Since the build-up welding is accompanied by a melting, it can form a reformed layer having a high adhesive strength, but a high calorie source is required to cause deformation by heat if treatment is applied to a large area. Therefore, the application of this technique to a water wheel runner is practically limited to a limited portion, and so it is difficult to treat the entire face of the runner, as required. Moreover, the application of plasma spray-coating to three-dimensional parts having complicated shapes is also more difficult, as in the technique disclosed in the aforementioned Japanese Patent Laid-Open No. 88201/1994. In addition, the Co alloy has a surface film hardness which is insufficient in the case of high sediment density so that a sufficient wear resistance cannot be achieved. These problems have not been solved by the technique disclosed in the aforementioned Japanese Patent Laid-Open No. 75767/1990.

As described above, it is difficult to coat a runner having a three-dimensional shape in a narrow space with a satisfactory surface film having a sufficient hardness and adhesive strength by using the spray-coating method. Specifically, when the spray-coating method is used, it is necessary to use the aforementioned manufacturing method using a welding operation for the assembly. However, when a surface film coating is applied by the spray-coating method to a runner manufactured using a welding operation, the following problems have been brought to light by detailed investigations.

First of all, the parts, spray-coated all over the surfaces thereof, can neither be welded nor provide a satisfactory welding strength. Moreover, the temperature of the parts will be raised in the vicinity of the welded portions by the welding heat so that a thermal strain is caused in the hard surface films generally having a smaller coefficient of thermal expansion than those of metals, thereby to cause a separation of the surface films or a lower adhesive strength. This makes it impossible to effectively coat the welded portions and their vicinities with the surface films.

However, the welded portions of the runner, i.e., the joints between the crown and the blade and between the shroud or band and the blade, have a relatively high flow speed and a high sedimental collision frequency so that they are liable to experience sediment wear and cavitation damage. These portions are damaged, if coated with no surface film, by sediment wear and cavitation damage thereby to cause the performance to drop or the lifetime to shorten.

On the other hand, if the crown and the blade, and the shroud or band and the blade, spray-coated with no film in the vicinity of the welded portions, are welded, and these individual welded portions are then spray-coated, after being welded, with the surface films, the following problems result, as has been brought to light by the detailed investigations.

In order to achieve a sufficient adhesive strength, the surfaces to be coated have to be properly roughened, before being coated with the spray-coated films, by a sandblasting treatment. In the case of the present example, however, the spray-coated films are already present in the vicinity of the welded portions and may be damaged by the sandblasting treatment thereby to reduce the adhesive strength. In order to remove the residual strain from the welded portions, moreover, the welded structures have to be subjected to a heat treatment, referred to as a Stress Releasing treatment ("SR-treatment"). Generally speaking, since the hard surface film to be formed by the spray-coating method has a small coefficient of thermal expansion, the coating surface film, as formed before the welding operation, may be separated or broken by thermal strain if a proper temperature is set at the SR-treatment. When the welded portions are coated with spray-coated surface films before the SR-treatment, on the other hand, other strains are caused in the surface films by the release, as effected by the SR-treatment, of the residual strain in the welded portions, so that a separation and breakage of the surface films become more likely to occur.

SUMMARY OF THE INVENTION

The present invention contemplates to solve the above-specified problems and has an object to provide a runner and a water wheel, which have such excellent wear and corrosion resistance characteristics that they can be used even under conditions where sediment is contained in a fluid being handled, and a method of manufacturing the same.

In order to achieve the above-specified object, according to a feature of the present invention, there is provided a runner to be rotated by a working fluid or a fluid flowing in a passage. The runner is coated on at least a portion of its surface with a first surface film containing a metal, as selected from the group consisting of Ni, Cr and Co, and a chromium carbide, and a second surface film containing a metal, as selected from the group consisting of Ni, Cr and Co, and a tungsten carbide.

According to another feature of the present invention, there is provided a runner to be rotated by a working fluid or a fluid flowing in a passage and comprising components including a crown, a band and a blade. The components are coated, on at least portions of their surfaces, with a first surface film containing a metal, as selected from the group consisting of Ni, Cr and Co, and a chromium carbide, and, on at least portions of the joint between said crown and said blade and the joint between said band and said blade, are coated with a second surface film containing a metal, as selected from the group consisting of Ni, Cr and Co, and a tungsten carbide.

According to another feature of the present invention, there is provided a water wheel comprising a runner driven to rotate by a working fluid or a fluid flowing in a passage; a spindle to be rotated together with said runner; a bearing supporting said spindle; and a generator connected to said spindle to rotate together.

According to another feature of the present invention, there is provided a method of manufacturing a runner to be rotated by a working fluid or a fluid flowing in a passage, comprising the steps of coating at least a portion of the surface of said runner with a first surface film containing a metal, as selected from the group consisting of Ni, Cr and Co, and a chromium carbide; and then coating the same with a second surface film containing a metal, as selected from the group consisting of Ni, Cr and Co, and a tungsten carbide.

According to another feature of the present invention, there is provided a method of manufacturing a water wheel including a runner having a crown, a band and a blade, a spindle, a bearing and a generator, comprising the steps of coating at least portions of the surfaces of its crown, band and blade forming no runner or before being jointed, with a first surface film containing a metal, as selected from the group consisting of Ni, Cr and Co, and a. chromium carbide; jointing said blade between said crown and said band to form said runner; heating the assembly at a temperature of 350° C. or higher and 650° C. or lower, desirably at 400° C. or higher and 650° C. or lower for 1 to 30 hours; and coating at least portions of the joint between said crown and said blade and the joint between said band and said blade, with a second surface film containing a metal, as selected from the group consisting of Ni, Cr and Co, and a tungsten carbide.

According to the present invention, there is provided a runner coated on at least a portion of its surface with a first surface film containing a metal, as selected from the group consisting of Ni, Cr and Co, and a chromium carbide; and a second surface film containing a metal, as selected from the group consisting of Ni, Cr and Co, and a tungsten carbide.

The runner is coated on at least a portion of its surface with a first surface film containing a metal, as selected from the group consisting of Ni, Cr and Co, and a chromium carbide and having a Vickers hardness of 700 or more; and a second surface film containing a metal, as selected from the group consisting of Ni, Cr and Co, and a tungsten carbide and having a higher Vickers hardness of 1,000 or more than that of said first surface film.

The first surface film and the second surface film, that is, the first surface film composed of $Cr_3C_2$ as chromium carbide and the second surface film composed of WC as tungsten carbide have a hardness of Hv 700 or more and a hardness of Hv 1,000 or more, and they exhibit excellent corrosion resistance. The sediment is composed mainly of feldspar and quartz, of which the feldspar has a hardness of Hv 600 to 700, whereas the quartz has a hardness of Hv 900 to 1,000. In the case of sediment wear, the wear resistance abruptly rises if the hardness of sediment particles is exceeded. By coating with a surface film having a hardness of Hv 700 or Hv 1,000 or more, therefore, a sufficient wear resistance can be exhibited for preventing sediment wear and cavitation damage.

If a spray-coating method is used as the surface film coating method, the first surface film can be made as thick as several tenths mm to 1 mm, and the second surface film can be made as thick as several tenths mm to 0.5 mm. As a result, the surface films can be coated, if spray-coated, to have thickness capable of warranting a sufficient lifetime against sediment wear and cavitation damage.

Spray-coating is divided into a variety of methods, which are selected in accordance with their merits and demerits. A spray-coating method capable of forming the most dense surface film is the vacuum spray-coating method in which plasma spray-coating is executed under a reduced pressure. This vacuum spray-coating method cannot be practically applied to large-sized parts as in the present example, because the part to be treated will have to be coated in an evacuated container. Other methods capable of forming a coated dense surface film are a detonation spray-coating method and a high velocity oxygen fuel spray-coating method. The deterioration spray-coating method covers a wide coating area so that it is suitable for the coating of a large-sized planer member. However, the detonation spray-coating method requires a spray-coating gun and large-sized facilities, so that it is difficult to homogeneously coat a member which has a three-dimensional shape, such as a runner, or to coat a narrow space, such as a joint.

On the other hand, the high velocity oxygen fuel spray-coating method can form a dense surface film and requires only a relatively small gun and reasonable facilities, so that it can form a homogeneous and dense surface film for a member which has a three-dimensional shape or in a narrow space at a joint.

When a runner is to be manufactured, its components, i.e., a crown, a band and a blade, are individually coated with a first surface film containing a metal selected from the group consisting of Ni, Cr and Co and 50 wt. % to 90 wt. %, desirably 70 wt. % to 90 wt. % of $Cr_3C_2$, and the film is made as thick as 0.3 mm to 1.0 mm while leaving the region within 20 mm, desirably 50 mm, from the leading ends of the welded portion, as an uncoated portion.

The first surface film composed of $Cr_3C_2$ and Ni, Cr or Co is changed in its hardness by the content of $Cr_3C_2$. As the amount of $Cr_3C_2$ increases, the hardness rises, but the toughness is lost so that the film becomes fragile, and so the surface film is liable to be broken or separated, thereby to lower its reliability. For the amount of $Cr_3C_2$ ranging from 50 wt. % to 90 wt. %, the surface film has a sufficient hardness against sediment wear and can keep its toughness.

Within this range, moreover, the surface film has excellent corrosion and wear resistance to sediment wear. If the sedimental density is high, the amount of $Cr_3C_2$ has to be increased to enhance the hardness. In this case, the amount of $Cr_3C_2$ is desired to be in a range from 70 wt. % to 90 wt. %. For this range, the surface film can have a hardness of Hv 700 or more.

Since a number of fine voids are present in a spray-coated film, the surface film has to be as thick as 0.3 mm or more so that it may exhibit excellent corrosion and wear resistances. If the spray-coated film becomes thicker, its internal strain becomes higher to thereby lower the adhesive strength. From the point of view of the adhesive strength, this surface film has to be less thick than 1.0 mm. If the wear resistance of the surface film is considered, on the other hand, a sufficient lifetime can be expected for a thickness of 1.0 mm, and the thickness is desired to be less than 1.0 mm from the point of view of reducing the work and the energy extended. From the points specified above, a sufficient lifetime can be warranted against sediment wear and cavitation damage of the runner if the film thickness is set to a range from 0.3 mm to 1.0 mm, with the result that the productivity and the energy economy are improved.

The coefficient of thermal expansion of the first surface film containing $Cr_3C_2$ and Ni, Cr or Co is lower than that of a material such as iron or stainless steel. As a result, a thermal strain may be caused, if thermally influenced by the welding operation, to thereby lower the adhesive strength of the surface film. If, however, the region within 20 mm, desirably 50 mm, from the leading end of the welded portion is left uncovered, the thermal influences at the welding time can be avoided, so that an excellent adhesive strength of the first surface film can be isolated from the influences of the welding operation.

At this time, moreover, a metal plate having a thickness larger, desirably two times or more, than that of the first surface film is employed to form the uncovered portion of the first surface film. Since the spray-coating method, especially the high-speed flame spray-coating method, uses a remarkably high speed for the gas to be sprayed, a rupture is caused if the masking material has an insufficient strength. Without a sufficient thickness, moreover, the surface films are liable to merge at their masking portion and coated portion so that they are liable to separate at their end portions. On the other hand, these disadvantages can be avoided if a metal plate having a thickness two times as large as that of the surface film is used as the masking material.

When the runner is to be manufactured, on the other hand, the crown, the blade and band, as coated with the first surface film, are welded to prepare the water machinery runner, and are then heated at a temperature of 350° C. or higher and 650° C. or lower, desirably of 400° C. or higher and 650° C. or lower, for 1 to 30 hours. By this heat treatment of the proper temperature, the residual strain is released from the welded portions so that the deformation due to the strain release at the runner operating time and the drop in the fatigue strength of the welded portions are prevented, thereby to enhance the reliability. In the first surface film, moreover, the adhesive strength between the metal phase of Ni, Cr or Co and the $Cr_3C_2$ particles increases to increase the hardness of the surface film, and accordingly the resistances to sediment wear and cavitation damage are also increased. Moreover, the adhesive strength in the interface between the first surface film and the parent material increases to suppress the surface film separation. As a result, even if the surface film is cracked by some shock, it is prevented from being separated and coming out, thereby to enhance the reliability.

At higher heating temperatures, the release of the residual strain from the welded portions, the increase in the adhesive strength between the metal phase of Ni, Cr or Co and $Cr_3C_2$ in the surface film, and the increase in the adhesive strength in the interface between the surface film and the parent material progress faster, but thermal strain is caused due to the difference in the coefficient of thermal expansion between the surface film and the parent material, as has been described above. The temperature is desired to be at 650° C. or less if the influences upon the surface film by the thermal strain are considered. If the releasing rate of the residual strain from the welded portions and the rate of improvement of the surface film are considered, on the other hand, the temperature is limited by 350° C. If the temperature is lower than this level, the heat treatment takes too long to be used for industrial applications.

If practical applications are considered, the temperature is desired to be in a range from 400° C. to 650° C. If the temperature range from 350° C. to 650° C. is examined, the treatment takes 20 hours at the minimum at 350° C., but the treatment is effective even for 1 hour at 650° C. Within the temperature range from 400° C. to 650° C., the treatment converges for 30 hours. If the effect and the energy economy are considered, therefore, the heating time period is desired to range from 1 hour to 30 hours.

When the runner is to be manufactured, the joints between the crown and the blade and between the band and the blade are coated, after being heated, with a second surface film containing at least one metal selected from the group consisting Ni, Cr and Co and 50 wt. % and more and 90 wt. % or less, desirably 70 wt. % or more and 90 wt. % or less of WC and having a thickness from 0.1 mm to 0.5 mm, and this second surface film is overlapped at least partially on the first surface film.

The second surface film containing WC and Ni, Cr or Co has a hardness of Hv 1,000 or more and excellent corrosion and wear resistances to sediment wear. If the amount of WC is increased, on the other hand, the surface film hardness increases, but the surface film loses its toughness and becomes fragile so that it is liable to be broken and separated, thereby to lower its reliability. If the WC amount is within the range from 50 wt. % to 90 wt. %, the surface film can have a sufficient hardness against sediment wear and can keep its toughness. When the sediment density is high, however, the WC amount has to be increased to enhance the surface film hardness. In this case, the WC amount is desirably in a range from 70 wt. % to 90 wt. %.

The joints between the crown and the blade and between the band and the blade are portions where the flow speed and the sediment impact frequency are so high that sediment wear and cavitation damage are liable to occur. This damage can be prevented by coating the joints with the second surface film.

In the high-speed flame spray-coating method, the carbide particles are neither molten nor decomposed, but collide against and deposit on the members while being in the form of particles. For a higher density and larger particle weight, therefore, the carbide particles highly bite into the parent material to establish a high and satisfactory adhesive strength. The WC particles having a large gravity highly bite into the parent material so that a sufficient adhesive strength can be achieved from the surface roughness by the grinding work without sandblasting treatment for the pretreatment. Since the WC is harder than $Cr_3C_2$, moreover, it sufficiently bites into the first surface film already coated, to establish a satisfactory adhesive strength.

In order that the spray-coated film composed of WC and Ni, Cr or Co, that is, the second surface film, may exhibit excellent corrosion and wear resistances, its thickness has to exceed 0.1 mm. As the thickness increases, on the other hand, the strain in the second surface film increases to lower the adhesive strength. From this adhesive strength, this spray-coated film has to be less than 0.5 mm. If the wear resistance of this second surface film is considered, a sufficient lifetime is expected for a film thickness of 0.5 mm, and a thickness less than this value of 0.5 mm is desired for reducing the processing and economizing energy.

The rupture and separation of a surface film are liable to occur from the end portion of the film. By causing the second surface film to partially overlap on the first surface film, therefore, the parent material is coated without any seam so that the resistance to sediment wear and cavitation damage and the reliability can be enhanced.

The coefficient of thermal coefficient of the second surface film is smaller than that of the first surface film if the deposition percentages of the contained metals are equal, so that a higher thermal strain is caused due to the difference in the coefficient of thermal expansion-from the parent material. On the other hand, the welded portions are deformed by releasing the residual strain. As a result, the thermal strain and the strain caused by the release of the residual strain are applied to the second surface film coating the welded portions. Since the spray-coated films may be broken or separated by the added strains, the welded portions have to be coated with the second surface film after being heated to a temperature of 350° C. or more and 650° C. or less.

DESCRIPTION OF THE PREFERRED EMBODIMENT

A water machinery runner and its method of manufacture according to one embodiment of the present invention will be described in the following with reference to the accompanying drawings.

Figure 1:
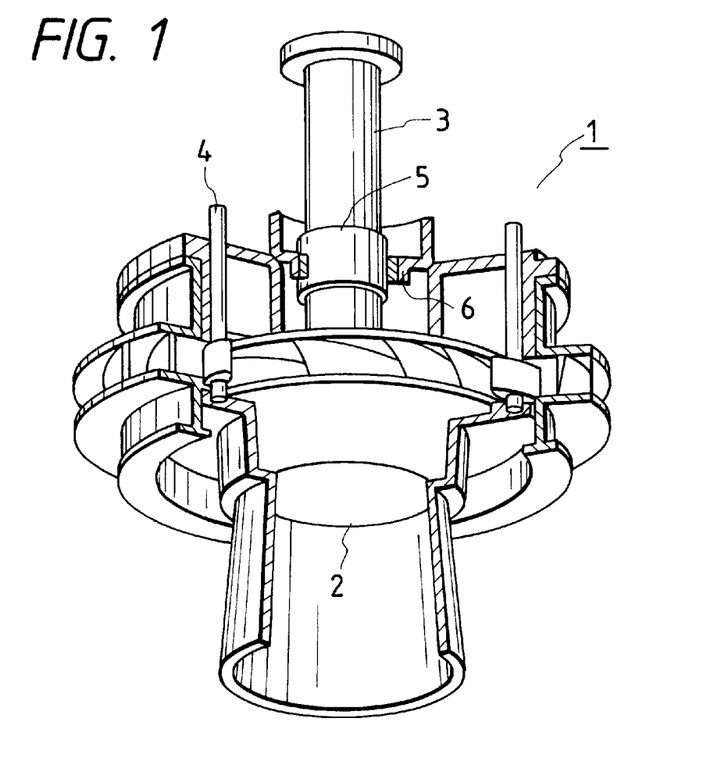
FIG. 1 is a perspective view partly in section of a water wheel including a hydraulic machinery runner according to one embodiment of the present invention.

FIG. 1 shows the construction of a water wheel having a water machinery runner according to the embodiment of the present invention. In order to more clearly illustrate the internal structure, the water wheel is illustrated with its casing being partially split. As to the hatching of the split section, incidentally, different kinds of hatching are not used in FIG. 1 for individual members so as to avoid complexity in the view.

As shown in FIG. 1, a water wheel 1 is constructed to include a water machinery runner 2 (referred to simply as a "runner"), a shaft 3, a guide vane 4, a sleeve 5 and a bearing 6. The runner 2 is rotated by flowing water coming in through the guide vane 4. Simultaneously with this, the shaft 3, which is connected to the runner 2, is rotated. The (not-shown) generator, which is connected to the shaft 3, generates electric power when it is rotated.

If much sediment is contained in the flowing water coming into the runner 2, this runner 2 and the guide vane 4 will become worn by the impact of the sediment particles therewith. In order to prevent such sediment wear, the runner 2 and the guide vane 4 are coated at their portions where the water flow speed and the sediment impact frequency are anticipated to be so high as to cause sediment wear, the coating including a first surface film of $Cr_3C_2$—16 wt. % of Ni—4 wt. % of Cr (expressed by "$Cr_3C_2$—20% NiCr") and a second surface film of WC—20 wt. % of Ni—5 wt. % of Cr (expressed by "WC—25% NiCr").

Especially, the runner 2 is coated, at its crown, band and blade where the water flow speed and sediment impact frequency are anticipated to be so high as to cause sediment wear, with a surface film of $Cr_3C_2$—20% NiCr having a thickness from 0.3 mm to 1.0 mm, and, at its joints between the crown and the blade and between the band and the blade, with a surface film of WC—25% NiCr having a thickness from 0.1 mm to 0.5 mm. Moreover, the $Cr_3C_2$20% NiCr surface film and the WC—25% NiCr are partially overlapped, and this overlap is given a structure having a lower layer of the $Cr_3C_2$—20% NiCr and an upper layer of the WC—25% NiCr.

Figure 2:
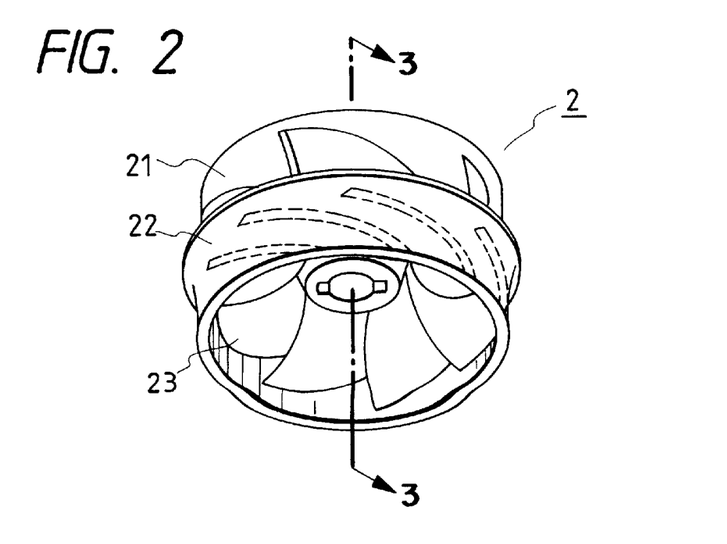
FIG. 2 is a perspective view of the water machinery to one embodiment of the present runner according invention.
Figure 3:
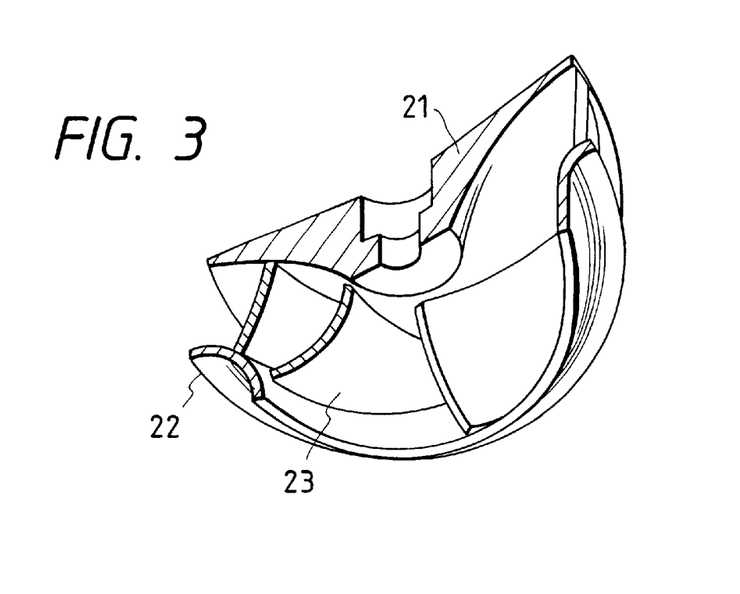
FIG. 3 is a perspective view, partially in section, showing the water machinery runner according to the embodiment of the present invention.

FIG. 2 is a perspective view showing the entirety of the runner of FIG. 1, and FIG. 3 is a perspective section taken along the line A—A of FIG. 2. As shown in FIGS. 2 and 3, the runner 2 is constructed to include a crown 21, a band 22 and a blade 23. The crown 21 and the blade 23, and the band 22 and the blade 23, are individually welded to form the runner 2.

Figure 4:
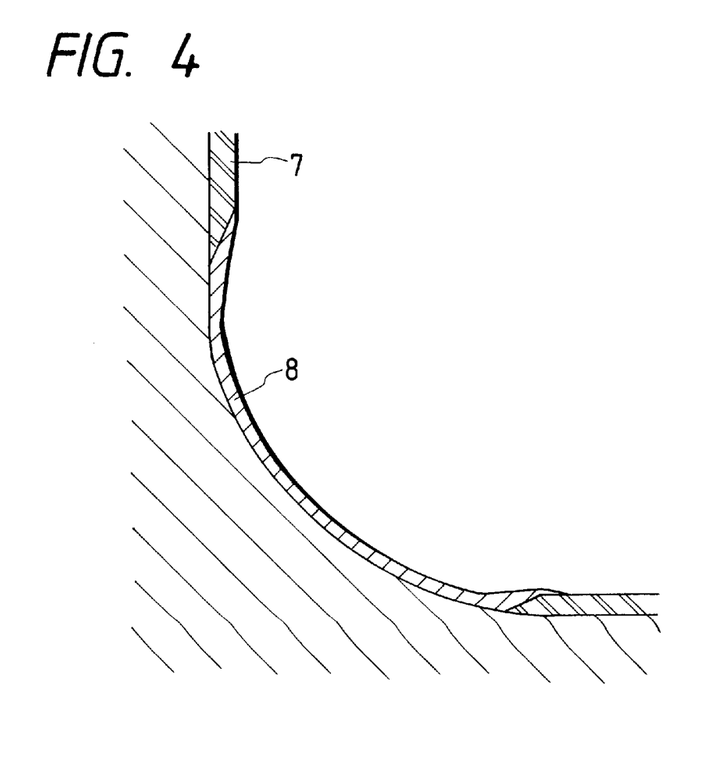
FIG. 4 is an enlarged section of the water machinery according to the embodiment of the present invention.

FIG. 4 is an enlarged section showing the welded portions between the crown 21 and the blade 23 and between the band 22 and the blade 23. Incidentally, the hatched sections of the crown 21, the band 22 and the blade 23 are not discriminated in FIG. 4. In FIG. 4, reference numeral 7 designates the $Cr_3C_2$—20% NiCr surface film (or the first surface film), and numeral 8 designates the WC—25% NiCr surface film (or the second surface film). These two surface films are partially overlapped within a range of about 10 mm to 50 mm.

In the present embodiment, the $Cr_3C_2$—20% NiCr surface film 7 and the WC—25% NiCr surface film 8 were formed by a high velocity oxygen fuel spray-coating method. In particular, the $Cr_3C_2$—20% NiCr surface film and the WC 25% NiCr surface film were examined as to the contents of $Cr_3C_2$ and WC, and these examinations have revealed that the range from 50 wt. % to 90 wt. % is good for preventing sediment wear and cavitation damage. However, if the sediment density exceeds 2 $Kg/m^3$ as in the Yangtze River, the Yellow River or a river after a heavy rainfall, for example, the percentages of $Cr_3C_2$ and WC have to be increased to enhance the surface film hardness. In this case, the amounts of $Cr_3C_2$ and WC are desirably in a range from 70 wt. % to 90 wt. %. On the other hand, the proper metallic components of the surface films are Ni, Cr and Co from the point of view of corrosion resistance, hardness and toughness. These metals can provide, if selected and combined, satisfactory corrosion resistance, hardness and toughness.

The $Cr_3C_2$—20% NiCr surface film 7 has a hardness of Hv 700 or more, whereas the WC—25% NiCr surface film 8 has a hardness of Hv 1,000 or more, and they exhibit excellent corrosion resistance. The sediment is composed mainly of feldspar and quartz, of which the feldspar has a hardness of Hv 600 to 700, whereas the quartz has a hardness of Hv 900 to 1,000. With regard to sediment wear, the wear resistance abruptly rises if the hardness of sediment particles is exceeded. By the coating with a surface film having a hardness of Hv 700 or Hv 1,000 or more, therefore, a sufficient wear resistance can be exhibited for protection against sediment wear and cavitation damage.

The hardness of the $Cr_3C_2$—20% NiCr surface film 7 and the WC—25% NiCr surface film 8 will change depending upon the amounts of $Cr_3C_2$ and WC. If the amounts of $Cr_3C_2$ and WC increase, the hardness of the surface films will be raised, but their toughness will be lost so that they become fragile, with the result that they are liable to be broken and separated, which undesirably lowers their reliability. For amounts of $Cr_3C_2$ and WC from 50 wt. % to 90 wt. %, the surface films can have sufficient hardness against sediment wear to keep their toughness.

Within this range, on the other hand, the corrosion resistance and the wear resistance to sediment wear are excellent. If the sediment density exceeds 2 $Kg/m^3$ as in the Yangtze River, the Yellow River or a river after a heavy rainfall, for example, the amounts of $Cr_3C_2$ and WC have to be raised to enhance the surface film hardness. In this case, it is desirable if the amounts of $Cr_3C_2$ and WC fall within a range from 70 wt. % to 90 wt. %, for which a hardness of more than Hv 700 and Hv 1,000 can be achieved for the surface films.

Since a number of fine voids are present in a spray-coated film, the $Cr_3C_2$—20% NiCr surface film 7 has to be as thick as 0.3 mm or more so that it may exhibit excellent corrosion and wear resistances. If the spray-coated film becomes thicker, its internal strain becomes higher, resulting in a lowering of the adhesive strength. From the point of view of the adhesive strength, the $Cr_3C_2$—20% NiCr surface film 7 has to be less than 1.0 mm thick.

If the wear resistance of the $Cr_3C_2$—20% NiCr surface film 7 is considered, on the other hand, a sufficient lifetime can be expected for a thickness of 1.0 mm, however it may be desirable for the thickness is desired to be less than 1.0 mm from the point of view of reducing the work and the energy expended.

There is also a proper thickness range for the WC—25% NiCr surface film 8. Generally speaking, the surface film containing WC is harder and has a higher internal strain, when formed, than the surface film containing $Cr_3C_2$. Because of the spray-coated film, however, a number of fine voids are present as in the $Cr_3C_2$—20% NiCr surface film.

For excellent corrosion and wear resistances, therefore, the surface film has to be no less than 0.1 mm. As described above, on the other hand, it is required from the point of view of the strain that the surface film be thinner than 0.5 mm. Considering the wear resistance, moreover, the surface film is expected to have a sufficient lifetime if it has a thickness of 0.5 mm. A thickness of no more than 0.5 mm is also desired for reducing the work and for improving the energy economy.

The rupture and separation of the spray-coated film are liable to start from the end portions of the surface film. By coating the $Cr_3C_2$—20% NiCr surface film 7 in a partially overlapped manner with the WC—25% NiCr surface film 8, therefore, the parent material can be coated without any seam to enhance the reliability and the wear resistance to sediment wear and cavitation damage.

Since a number of voids are present in the spray-coated film, an overlap of at least 10 mm between the aforementioned $Cr_3C_2$20% NiCr surface film 7 and the WC—25%

NiCr surface film 8 is required from the point of view of the reliability. Since this effect converges if the overlap exceeds 50 mm, an extension ranging from 10 mm to 50 mm is proper for the required efficiency.

In the high velocity oxygen fuel spray-coating method, the carbide particles will neither be melted nor decomposed, but will impact against and deposit on the components as they are in the particle state. As a result, the denser and heavier particles can bite more deeply to establish a satisfactory adhesive strength. The WC particles having a large specific gravity bite deeply so that a sufficient adhesive strength can be achieved with the surface roughness of the grinding treatment without the pretreatment of sandblasting. Since WC has a higher hardness than $Cr_3C_2$, moreover, the overlying WC—25% NiCr surface film 8 can sufficiently bite into the $Cr_3C_2$—20% NiCr surface film 7 to establish a sufficient adhesive strength.

Incidentally in the case of use under a low sediment density, it is not always necessary to provide the WC—25% NiCr surface film as the upper layer coating. The $Cr_3C_2$—20% NiCr surface film can be used by itself, and the percentage of $Cr_3C_2$ is desirably increased in this case. In this case, moreover, the portions, which are left uncoated with the $Cr_3C_2$—20% NiCr surface film, are desirably sandblasted while protecting the applied $Cr_3C_2$—20% NiCr surface film.

Next, the method of manufacturing a water machinery runner according to one embodiment of the present invention will be described with reference to FIGS. 5 to 10.

Figure 5:
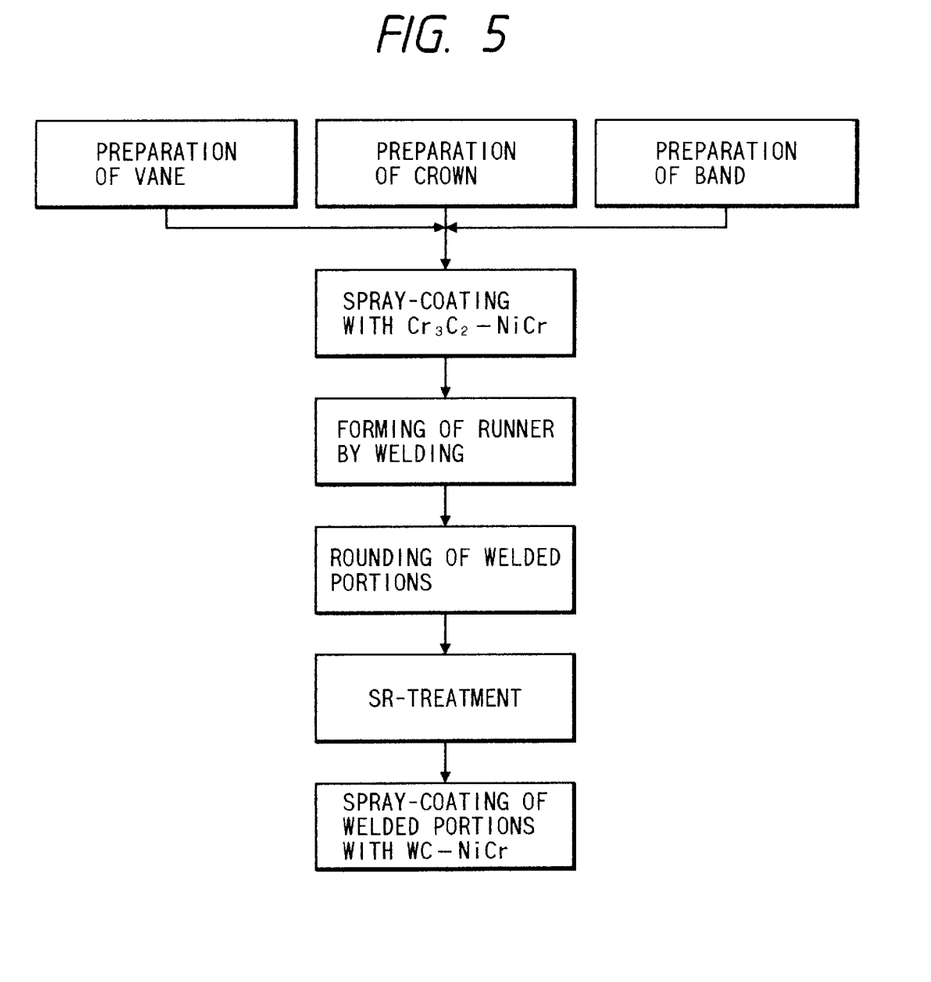
FIG. 5 is a flow chart showing a procedure for manufacturing the water machinery runner according to the embodiment of the present invention.

FIG. 5 shows the steps of the water wheel runner according to one embodiment of the present invention. First of all, the crown 21, the band 22 and the blade 23 are individually prepared. Next, the crown 21, the band 22 and the blade 23 thus individually prepared are coated with the $Cr_3C_2$—20% NiCr surface film 7 by the high velocity oxygen fuel spray-coating method. of the various spray-coating methods, this high velocity oxygen fuel spray-coating method can form a dense surface film and is required to have relatively small spray-coating guns and facilities so that it can form a homogeneous and dense surface film on a member having a three-dimensional shape and a narrow space, as at the joints. Thus, the high velocity oxygen fuel spray-coating method is the most proper one for coating a member having a three-dimensional shape, such as the runner 2.

When the $Cr_3C_2$—20% NiCr surface film 7 is to be applied, a metal plate, which is thicker thick than, desirably two times thick as, the $Cr_3C_2$—20% NiCr surface film 7, is applied to the portions to be welded, thereby to protect the $Cr_3C_2$—20% NiCr surface film 7. The metal plate has sufficient strength and heat resistance, if it is two times as thick as or thicker than the surface film, against the high-speed gas in the high velocity oxygen fuel spray-coating method so that rupture and scattering can be prevented. With two-times the thickness of the surface film, moreover, satisfactory surface film end portions can be formed without any merging between the masking portions and the surface film to be coated.

Next, the crown 21 and the blade 23, and the band 22 and the blade 23 are welded to form the runner 2. After this welding operation, the welded portions 9 are worked into a proper rounded (R-machined) shape to prevent any stress concentration at the time of running. Next, the runner 2 is placed in a furnace and is subjected to the SR-treatment at a temperature ranging from 350° C. to 650° C., desirably from 400° C. to 650° C. for a time period ranging from 1 hour to 30 hours.

In the present embodiment, the runner 2 is held at 550° C. for 15 hours and is then cooled down in the furnace. Incidentally, the time period of 15 hours is a holding time at 550° C. During this heat treatment at 550° C., the surface film hardness is raised for the holding time of about 5 hours or longer, and the adhesive strength is drastically improved for the holding time of about 10 hours or longer. The runner 2 is such a large-sized part that it cannot be abruptly heated and cooled with ease, and this abrupt temperature change is not proper for the thermal strain of the surface film. The runner 2 is held in the furnace at 550° C. for 15 hours and is then gently cooled in the furnace. After sufficient cooling, the oxide films on the welded and rounded portions are ground again, and the welded portions are then coated with the WC—25% NiCr surface film 8.

Here will be detailed the aforementioned steps with reference to FIGS. 6 to 10.

Figure 6:
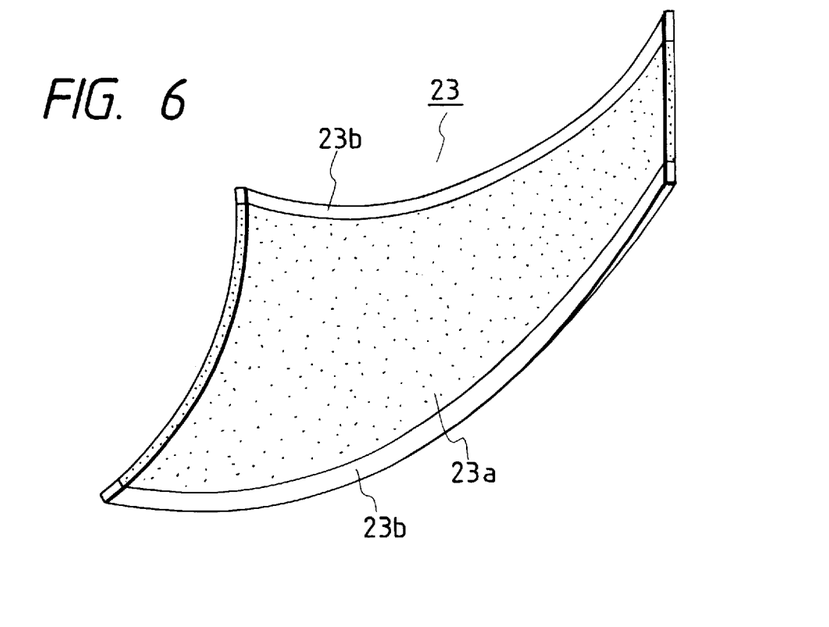
FIG. 6 is a perspective view showing a blade of the water machinery runner according to the embodiment of the present invention.

FIG. 6 shows a perspective of the exterior of the blade 23 which is coated with the $Cr_3C_2$—20% NiCr surface film 7 by the high velocity oxygen fuel spray-coating method. The blade 23 is coated all over its surface, except for the portions to be welded to the crown 21 and the band 22, with the $Cr_3C_2$—20% NiCr surface film 7.

Reference numeral 23a appearing in FIG. 6 does not present a section, but shows the portion coated with the $Cr_3C_2$—20% NiCr surface film 7. The unhatched portions are the uncoated portions 23b extending by 40 mm at the least and by 70 mm at the most from the end faces to be welded. In these uncoated portions 23b, after being welded, the distance between the end portions of the $Cr_3C_2$—20% NiCr surface film 7 and the welded portions ranges from 20 mm to 50 mm (as will be detailed hereinafter). Although not especially shown, the crown 21 and the band 22 are likewise coated with the $Cr_3C_2$—20% NiCr surface film 7.

The $Cr_3C_2$—20% NiCr surface film 7 has a smaller coefficient of thermal expansion than that of materials such as iron or stainless steel. As a result, the thermal influences from the welding operation may cause the thermal strain to lower the adhesive strength of the surface film. If, however, the region within the range of 20 mm, desirably 50 mm from the portions to be welded, are left uncoated, the thermal influences of the welding operation can be avoided, thereby to leave the satisfactory adhesive strength of the $Cr_3C_2$—20% NiCr surface film 7 uninfluenced by the welding operation.

Figure 7:
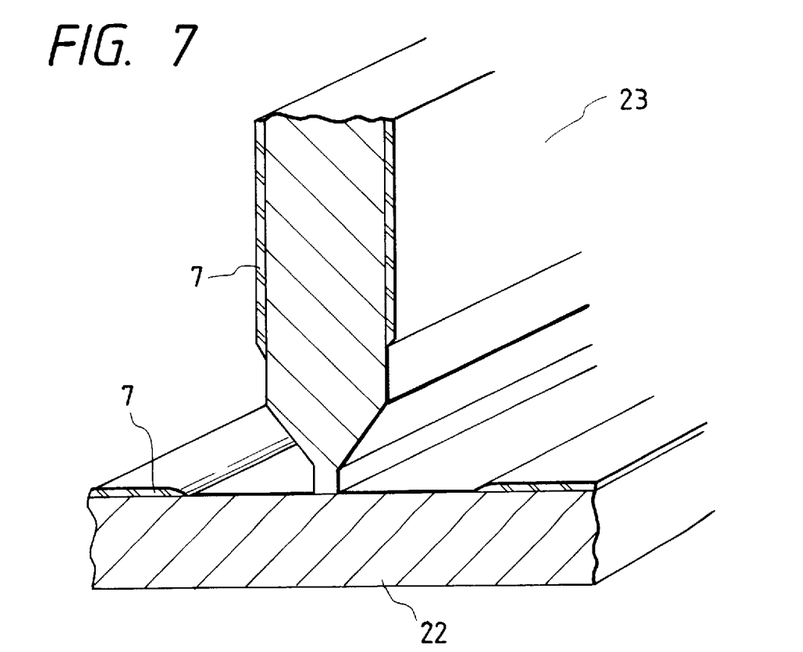
FIG. 7 is a perspective view showing the blade and the band-welded portion of the water machinery runner according to the embodiment of the present invention.

The details of the subsequent welding and rounding (or R-machining) operations will be described by taking up the welding operations of the band 22 and the blade 23.

FIG. 7 is a section showing the portions of the band 22 and the blade 23 that are to be welded. The crown 21 and the blade 23, and the band 22 and the blade 23, are completely penetration-welded to have shapes as shown in FIG. 7.

Figure 8:
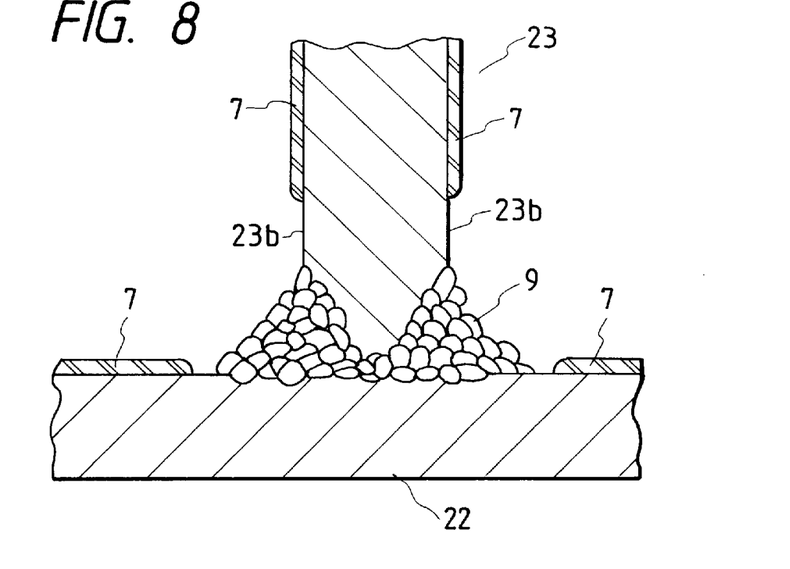
FIG. 8 is a section showing the blade and the band-welded portion, before being rounded, of the water machinery runner according to the embodiment of the present invention.

FIG. 8 presents a section as seen after the welding operation. Incidentally, a welded portion 9 appearing in FIG. 8 indicates a weld line, which is laminated in multiple layers, but is not hatched. The uncoated portion 23b having no coating of the $Cr_3C_2$—20% NiCr surface film 7, ranging from 40 mm to 70 mm from the end faces to be welded extends, after being welded, such that the end portions of the $Cr_3C_2$—20% NiCr surface film 7 and the welded portion 9 are spaced from each other by 20 to 50 mm.

Figure 9:
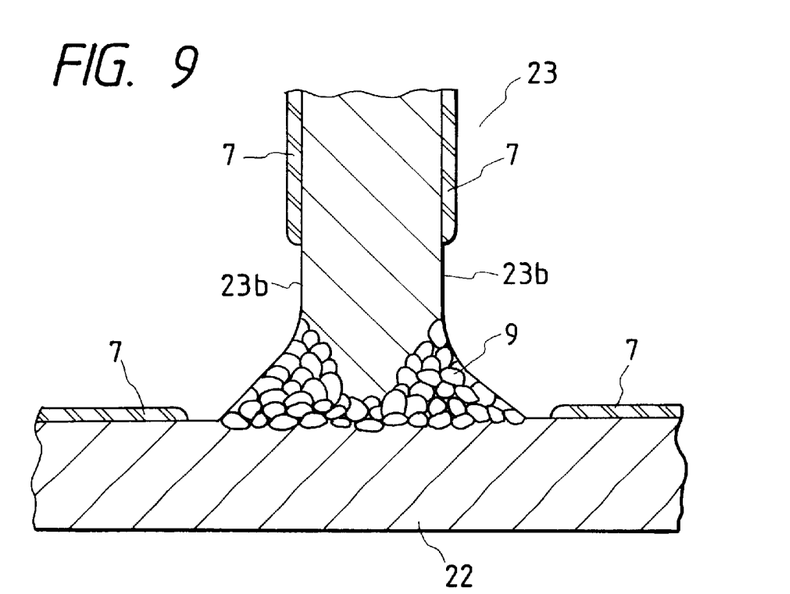
FIG. 9 is a section showing the blade and the band-welded portion, after being rounded, of the water machinery runner according to the embodiment of the present invention.

FIG. 9 is a section showing that the welded portion 9 is ground into a proper rounded (R-machined) shape. After this shaping treatment, the runner is subjected to a SR-treatment in which it is placed in the furnace and held at a temperature ranging from 350° C. to 650° C., desirably from 400° C. to 650° C., for a time period from 1 hour to 30 hours.

Due to the heat treatment at this temperature, the residual strain is released from the welded portion so that the deformation resulting from the strain release and the drop in the fatigue strength of the welded portion can be prevented at the time of use to enhance the reliability. In the $Cr_3C_2$—20% NiCr surface film 7, moreover, the adhesive strength between the Ni or Cr and the $Cr_3C_2$ particles is enhanced so that the surface film hardness is increased, so as to raise the wear resistance to sediment wear and cavitation damage.

In the interface between the $Cr_3C_2$—20% NiCr surface film 7 and the parent material, moreover, the adhesive strength is increased so as to suppress the surface film separation. As a result, even if the surface film is cracked by some shock, the separation and coming-out of the surface film are suppressed, thereby to enhance the reliability.

At a higher heating temperature, the release of the residual strain from the welded portion, the increase in the adhesive strength between the metal phase of Ni or Cr and the $Cr_3C_2$ particles in the surface film, and the increase in the adhesive strength in the interface between the surface film and the parent material progress the faster, but a thermal strain is caused by the difference in the coefficient of thermal expansion between the $Cr_3C_2$—20% NiCr surface film 7 and the parent material. The temperature is desirably kept lower than 650° C. if the influences of the thermal strain upon the surface film are taken into consideration.

If, moreover, the rate of releasing the residual strain from the welded portion and the rate of improving the surface film are considered, the temperature is limited by 350° C., and the lower temperature will take a longer time period, thereby to make the processing of industrial applications difficult. For practical applications, the desired temperature ranges from 400° C. to 650° C. If the examinations are made for a temperature ranging from 350° C. to 650° C., the heating effect takes 20 hours at the minimum at 350° C., but 1 hour at the minimum at 650° C. This effect converges for 30 hours if examinations are made for the temperature ranging from 400° C. to 650° C. In consideration of the effect and the energy economy, therefore, the heating time period is desirably set in a range from 1 hour to 30 hours.

Figure 10:
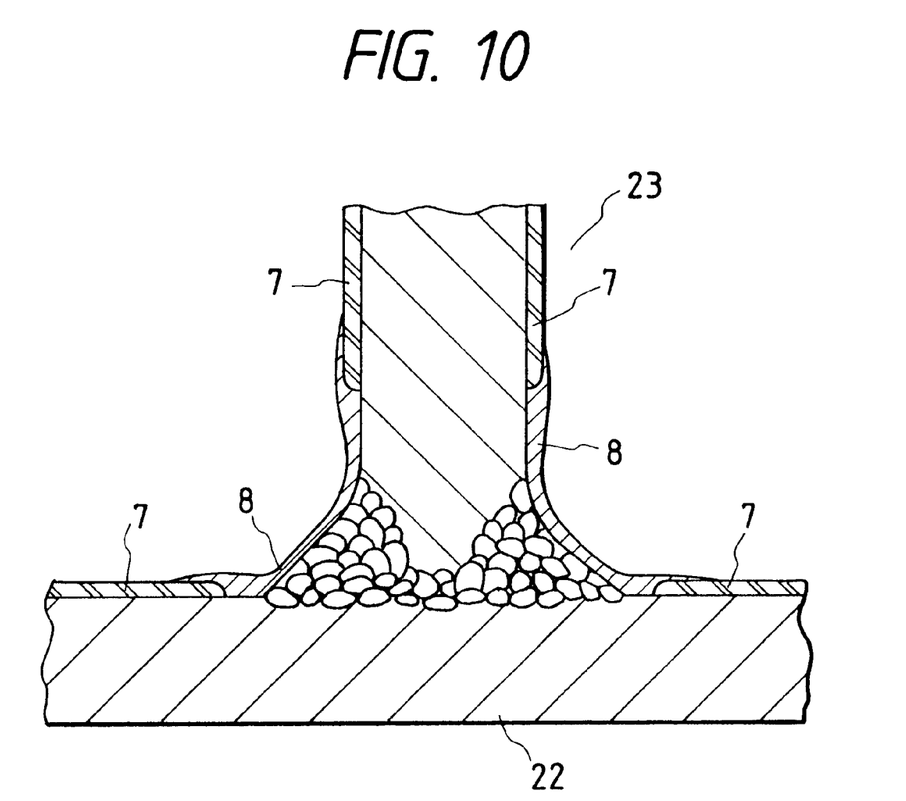
FIG. 10 is a section showing the blade and the band-welded portion, after being coated with a surface film, of the water machinery runner according to the embodiment of the present invention.

FIG. 10 shows the sectional shape after the R-shaped welded portion is coated with the WC—25%NiCr surface film 8 This WC—25% NiCr surface film 8 is partially overlapped on the $Cr_3C_2$—20% NiCr surface film 7. Due to this partially overlapped coating, the parent material is coated without any seam so that the wear resistance to sediment wear and cavitation damage is increased, thereby to enhance the reliability.

The reason why the coating of the WC—25% NiCr surface film 8 is executed after the SR-treatment is as follows. The WC—25% NiCr surface film 8 has a smaller coefficient of thermal expansion than the $Cr_3C_2$—20% NiCr surface film 7 so that, in the SR-treatment more thermal strain is produced than in the $Cr_3C_2$—20% NiCr surface film 7. Since the residual strain is released from the welded portion, moreover, more strain may be established to crack the WC—25% NiCr surface film 8 even if the $Cr_3C_2$—20% NiCr surface film 7 is within a temperature range s which will invite neither separation nor cracking.

Therefore, the welded portion has to be coated with the WC—25% NiCr surface film 8 after the SR-treatment. Moreover, the WC—25% NiCr surface film has a high density in the WC particles and accordingly a high adhesive strength so that it is suitable for the coating of the welded portion of the present embodiment, in which the whole surface cannot be sandblasted because of the influences upon the $Cr_3C_2$—20% NiCr surface film 7.

Incidentally, in the aforementioned embodiment, the spray-coating surface film is exemplified by use of the $Cr_3C_2$—20% NiCr surface film 7 and the WC—25% NiCr surface film 8, but the present invention should not be limited to this composition, as has been described hereinbefore. The surface films suited for use in accordance with the present invention are exemplified by a $Cr_3C_2$—15% NiCr surface film, a $Cr_3C_2$—25% NiCr surface film, a $Cr_3C_2$—15% CoCr surface film, a $Cr_3C_2$—20% CoCr surface film, a $Cr_3C_2$—25% CoCr surface film, a WC—15% NiCr surface film, a WC—20% NiCr surface film, a WC—15% Co surface film, a WC—20% Co surface film, a WC—25% Co surface film, a WC—15% CoCr surface film, a WC—20% CoCr surface film and a WC—25% CoCr surface film, which have excellent surface film strengths and adhesive strengths.

In the aforementioned embodiment, a high velocity oxygen fuel spray-coating method is used when the crown 21, the band 22 and the blade 23, as individually prepared, are coated with the $Cr_3C_2$—20% NiCr surface film 7. When these individual parts are to be spray-coated, however, the method should not be limited to use of the high velocity oxygen fuel spray-coating method, because the space is not narrow, but can be widened to an explosion spray-coating method or to a vacuum plasma spray-coating method in dependence upon the sizes of the parts.

According to the present invention, it is possible to realize a runner which is so excellent in wear and corrosion resistances that it can be used under conditions in which the fluid contains sediment, and it is possible to manufacture the runner efficiently at a low cost.

It is also possible to realize water machinery so excellent in its wear and corrosion resistances that it can be used under conditions in which the fluid contains sediment, and it is possible to manufacture the water machinery efficiently at a low cost.

What is claimed is:

1. A runner comprising a surface coated on at least a portion thereof with a first surface film containing a metal, as selected from the group consisting of Ni, Cr and Co, and a chromium carbide; and a second surface film containing a metal, as selected from the group consisting of Ni, Cr and Co, and a tungsten carbide, wherein said first surface film and said second surface film are overlapped at least partially.

2. A runner comprising a crown, band and blade is coated, on at least a portion of the surfaces of its crown, band and blade, with a first surface film containing a metal, as selected from the group consisting of Ni, Cr and Co, and a chromium carbide, and, on at least a portion of a joint between said crown and said blade and a joint between said band and said blade, with a second surface film containing a metal, as selected from the group consisting of Ni, Cr and Co, and a tungsten carbide.

3. A runner comprising a surface coated on at least a portion thereof with a first film containing a metal, as selected from the group consisting of Ni, Cr and Co, and a chromium carbide and having a Vickers hardness of 700 or more; and a second surface film containing a metal, as selected from the group consisting of Ni, Cr and Co, and a tungsten carbide and having a higher Vickers hardness of 1,000 or more than that of said surface film, wherein said first surface film and said second surface film were overlapped at least partially.

4. A runner comprising a crown, band and blade is coated, on at least a portion of the surfaces of its crown, band and blade, with a first surface film containing a metal, as selected from the group consisting of Ni, Cr and Co, and a chromium carbide, and having a Vickers hardness of 700 or more and, on at least a portion of a joint between said crown and said blade and a joint between said band and said blade, with a second surface film containing a metal, as selected from the group consisting of Ni, Cr and Co, and a tungsten carbide and having a higher Vickers hardness of 1,000 or more than that of said first surface film.

5. A runner according to any of claim 2 to 4,
    wherein said first surface film and said second surface film are overlapped at least partially.
6. A runner according to any of claims 1 to 4,
    wherein said first surface film forms a lower layer whereas said second surface film forms an upper film in their overlapped portions.
7. A runner according to any of claims 1 to 4,
    wherein said first surface film contains 50 to 90 wt. % of chromium carbide whereas said second surface film contains 50 to 90 wt. % of tungsten carbide.
8. A runner according to any of claims 1 to 4,
    wherein the chromium carbide in said first surface film is $Cr_3C_2$ whereas the tungsten carbide in said second surface film is WC.
9. A runner according to any of claims 1 to 4,
    wherein said first surface film contains 70 to 90 wt. % of chromium carbide whereas said second surface film contains 70 to 90 wt. % of tungsten carbide.
10. A runner according to claim 5, wherein said first surface film forms a lower layer whereas said second surface film forms an upper film in their overlapped portions.
11. A runner according to claim 5, wherein said first surface film contains 50 to 90 wt. % of chromium carbide whereas said second surface film contains 50 to 90 wt. % of tungsten carbide.
12. A runner according to claim 5, wherein the chromium carbide in said first surface film is $Cr_3C_2$ whereas the tungsten carbide in said second surface film is WC.
13. A runner according to claim 6, wherein said first surface film contains 50 to 90 wt. % of chromium carbide whereas said second surface film contains 50 to 90 wt. % of tungsten carbide.
14. A runner according to claim 6, wherein the chromium carbide in said first surface film is $Cr_3C_2$ whereas the tungsten carbide in said second surface film is WC.
15. A runner according to claim 6, wherein said first surface film contains 70 to 90 wt. % of chromium carbide whereas said second surface film contains 70 to 90 wt. % of tungsten carbide.
16. A runner according to claim 5, wherein said first surface film contains 70 to 90 wt. % of chromium carbide whereas said second surface film contains 70 to 90 wt. % of tungsten carbide.
17. A water wheel for driving a generator comprising: a runner according to any of claims 1–4 driven to rotate by a working fluid or a fluid flowing in a passage; a guide vane arranged around said runner; a spindle fitted in said runner; and a bearing supporting said spindle.
18. A runner according to claim 17, wherein said first surface film forms a lower layer whereas said second surface film forms an upper film in their overlapped portions.
19. A runner according to claim 17, wherein said first surface film contains 50 to 90 wt. % of chromium carbide whereas said second surface film contains 50 to 90 wt. % of tungsten carbide.
20. A runner according to claim 17, wherein the chromium carbide in said first surface film is $Cr_3C_2$ whereas the tungsten carbide in said second surface film is WC.
21. A runner according to claim 17, wherein said first surface film contains 70 to 90 wt. % of chromium carbide whereas said second surface film contains 70 to 90 wt. % of tungsten carbide.
22. A water wheel for driving a generator comprising: a runner driven to rotate by a working fluid or a fluid flowing in a passage; a guide vane arranged around said runner; a spindle fitted in said runner; and a bearing supporting said spindle;
    wherein said runner and said guide vane are coated on at least portions of their surfaces with a first surface film containing a metal, as selected from the group consisting of Ni, Cr and Co, and a chromium carbide; and a second surface film containing a metal, as selected from the group consisting of Ni, Cr and Co, and a tungsten carbide.
23. A water wheel for driving a generator comprising: a runner according to any of claims 1–4 driven to rotate by a working fluid or a fluid containing 2 $Kg/m^3$ or more solid particles; a guide vane arranged around said runner; a spindle fitted in said runner; and a bearing supporting said spindle.
24. A runner according to claim 23, wherein said first surface film forms a lower layer whereas said second surface film forms an upper film in their overlapped portions.
25. A runner according to claim 23, wherein said first surface film contains 50 to 90 wt. % of chromium carbide whereas said second surface film contains 50 to 90 wt. % of tungsten carbide.
26. A runner according to claim 23, wherein the chromium carbide in said first surface film is $Cr_3C_2$ whereas the tungsten carbide in said second surface film is WC.
27. A runner according to claim 23, wherein said first surface film contains 70 to 90 wt. % of chromium carbide whereas said second surface film contains 70 to 90 wt. % of tungsten carbide.
28. A method of manufacturing a water wheel having a runner, comprising the steps of: coating at least a portion of the surface of its runner with a first surface film containing a metal, as selected from the group consisting of Ni, Cr and Co, and a chromium carbide; and then coating the same with a second surface film containing a metal, as selected from the group consisting of Ni, Cr and Co, and a tungsten carbide.
29. A method of manufacturing a water wheel having a crown, band and blade, comprising the steps of: coating at least portions of the surfaces of its crown, band and blade forming no runner or before jointed, with a first surface film containing a metal, as selected from the group consisting of Ni, Cr and Co, and a chromium carbide; jointing said blade between said crown and said band to form said runner; heating the assembly at a temperature in a range of 350° C. or higher and 650° C. or lower, for 1 to 30 hours; and coating at least portions of the joint between said crown and said blade and the joint between said band and said blade, with a second surface film containing a metal, as selected from the group consisting of Ni, Cr and Co, and a tungsten carbide.
30. A method of manufacturing a water wheel according to claim 29,
    wherein said runner is formed by jointing said blade between said crown and said band by welding.
31. A method of manufacturing a water wheel according to any of claims 28 to 30,
    wherein when at least the portions of the surfaces of said crown, said band and said blade are to be coated with said first surface film, the regions within 20 mm, from the leading ends of the welded portions between said crown and said blade and between said band and said blade are left uncoated.

32. A method of manufacturing a water wheel according to any of claims 28 to 30, wherein the coating method of said first surface film and said second surface film is a spray-coating method.

33. A method of manufacturing a water wheel according to any of claims 28 to 30, wherein when said joints between said crown and said blade and between said band and said blade are coated with said second surface film after said runner has been heated, said second surface film is overlapped at least partially on said first surface film.

34. A method of manufacturing a water wheel according any of claims 28 to 30, wherein said first surface film contains 50 to 90 % of chromium carbide whereas said second surface film contains 50 to 90 wt. %, of tungsten carbide.

35. A method for manufacturing a water wheel according to any of claims 28 to 30, wherein the chromium carbide in said first surface film is $Cr_3C_2$ whereas the tungsten carbide in said second surface film is WC.

36. A method according to claim 29, wherein the heating is carried out at a temperature in a range of 400° C. or higher and 650° C. or lower.

37. A method according to claim 31, wherein regions within 50 mm of said leading ends are left uncovered.

38. A method according to claim 32, wherein said spray-coating method is a high-speed flame spray-coating method.

39. A method according to claim 34, wherein said first surface film contains 70 to 90 wt. % of chromium carbide, whereas said second surface contains 70 to 90 wt. % of tungsten carbide.

* * * * *